B. F. GINN.
TIRE ARMOR.
APPLICATION FILED DEC. 16, 1908.
940,591.
Patented Nov. 16, 1909
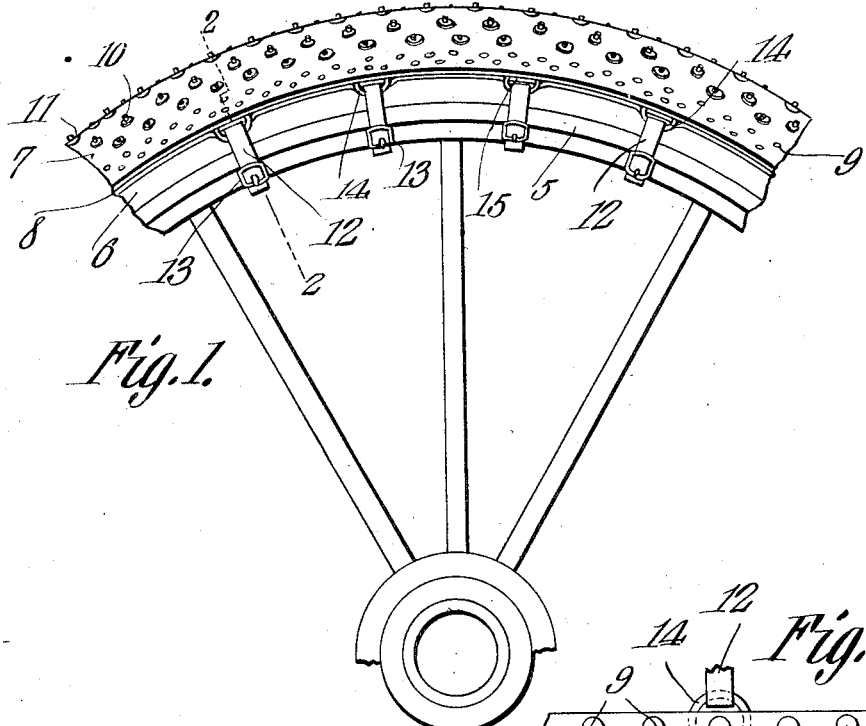
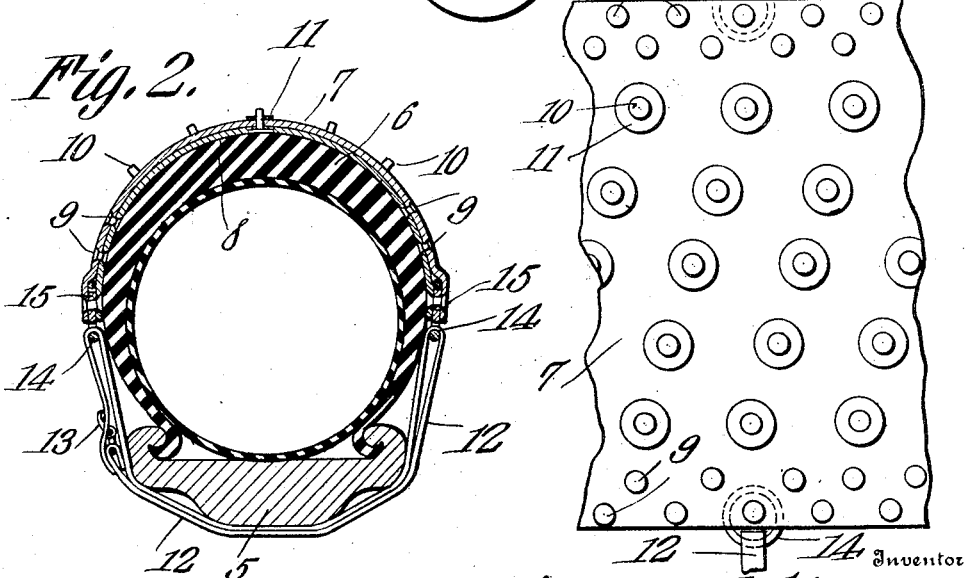
Witnesses
Inventor
Benjaman F. Ginn.

UNITED STATES PATENT OFFICE.

BENJAMAN F. GINN, OF LENOX, IOWA.

TIRE-ARMOR.

940,591.

Specification of Letters Patent. Patented Nov. 16, 1909.

Application filed December 16, 1908. Serial No. 467,911.

*To all whom it may concern:*

Be it known that I, BENJAMAN F. GINN, a citizen of the United States, residing at Lenox, in the county of Taylor and State of Iowa, have invented a new and useful Tire-Armor, of which the following is a specification.

This invention relates to pneumatic tire armor of that class comprising a flexible covering extending over the tire, and provided with means for preventing slipping or skidding of the wheels.

The object of the invention is to provide a tire armor of this kind which is simple and inexpensive, and which can be readily put on a tire or taken off, and which, when fastened to the tire, will be securely held in place thereon.

With the foregoing objects in view, the invention consists in a novel construction and arrangement of parts to be hereinafter described and claimed, reference being had to the drawings hereto annexed, in which, Figure 1 is a side elevation of a portion of a wheel showing its tire equipped with my improved armor. Fig. 2 is an enlarged transverse section on the line 2—2 of Fig. 1. Fig. 3 is a plan view of a fragment of the armor removed from the tire.

In the drawings, 5 denotes the rim of the wheel, and 6 is the tire connected thereto in the usual manner.

The armor which is the subject of the present invention comprises a continuous annular cover fitting snugly over the outside of the tire. The armor is composed of two thicknesses or layers of leather or raw-hide or other flexible material, said layers being indicated at 7 and 8 respectively. The layers have a width sufficient to completely cover the tread portion of the tire, and also to extend partly over the sides thereof. The two layers are of the same width, and are fastened together at their edges by two rows of rivets 9 which are set staggered. The two layers are further fastened together by rivets 10 arranged in rows evenly spaced apart, and extending diagonally across the tread portion of the armor. The last mentioned rivets project a suitable distance from the armor, and thus form spurs to increase traction and also to prevent skidding or slipping of the wheels. The rivets 10 are fitted with burs 11 engaging the outer surface of the outer layer 7 of the armor, whereby a partly metallic tread surface is had, without however affecting the resiliency of the armor, and the latter is also strengthened and will more successfully resist wear.

The armor is fastened to the tire by a series of straps 12 passing across the inner surface of the rim 5, and connected at their ends by buckles 13. The straps are connected to the armor by being passed through rings 14 carried thereby, said rings being secured to the armor at the edge thereof between the two layers, a piece 15 of leather or other material being placed between the two layers and being secured by one of the rivets 9, around which piece the ring extends, and whereby it is securely fastened to the armor, and effectually prevented from pulling out. Some of the rivets 9 are located close to the rings, by reason of which it will be evident that the two layers are drawn closely together, and the rings are thus rigidly held between the layers against the edges of the pieces 15, and prevented from working over said edges.

By the herein described fastening means, the armor can be quickly and easily mounted on the tire, and it will be securely held in place thereon.

The armor is simple in structure and therefore can be cheaply manufactured, and it effectually serves the purpose for which it is designed.

What is claimed is:—

A tire armor comprising a continuous flexible covering consisting of an inner and an outer layer, rivets fastening the layers together, said rivets being located on the tread portion of the armor, and along the edges thereof, and the rivets of the tread portion projecting from the same to form traction spurs, rings fastened between the layers, and projecting partly from the edges thereof, filling pieces within the portions of the rings lying between the layers, a portion of the aforesaid rivets which are at the edges of the armor passing through the layers and the filling pieces and through the layers adjacent to the rings, straps passing through the projecting portions of the rings and across the felly of the wheel, and means for adjustably connecting the ends of the straps.

In testimony that I claim the foregoing as my own, I have hereto affixed my signature in the presence of two witnesses.

BENJAMAN F. GINN.

Witnesses:
L. B. WILDON,
J. H. BENNISON.